United States Patent [19]

Sands

[11] 4,453,561
[45] Jun. 12, 1984

[54] CHECK VALVE ASSEMBLY FOR USE IN BACKFLOW PREVENTERS OR THE LIKE

[75] Inventor: Robert E. Sands, Shelbyville, Ill.

[73] Assignee: Mueller Co., Decatur, Ill.

[21] Appl. No.: 383,307

[22] Filed: May 28, 1982

[51] Int. Cl.³ .............................................. F16K 15/06
[52] U.S. Cl. .................................... 137/327; 137/218; 137/543.13; 137/543.23
[58] Field of Search ........... 137/218, 327, 328, 543.13, 137/543.23

[56] References Cited

U.S. PATENT DOCUMENTS

| | | | |
|---|---|---|---|
| 877,906 | 2/1908 | Clark | 137/543.13 X |
| 1,960,144 | 5/1934 | Entriken . | |
| 2,007,677 | 7/1935 | Farmer . | |
| 2,329,368 | 9/1943 | Wood . | |
| 2,389,413 | 11/1945 | Carlton . | |
| 2,503,424 | 4/1950 | Snyder . | |
| 2,577,967 | 12/1951 | Hughes . | |
| 2,586,942 | 2/1952 | Grove . | |
| 2,706,488 | 4/1955 | Harrington . | |
| 2,917,077 | 12/1959 | Ziege | 137/543.13 X |
| 3,035,604 | 5/1962 | Portis | 137/327 |
| 3,181,560 | 5/1965 | Worden et al. . | |
| 3,276,465 | 10/1966 | Wyckoff . | |
| 3,286,722 | 11/1966 | Royer | 137/218 |
| 3,724,487 | 4/1973 | Hunter . | |
| 4,132,246 | 1/1979 | Frisen | 137/542 X |
| 4,190,071 | 2/1980 | Dean et al. . | |
| 4,231,387 | 11/1980 | Dixon . | |
| 4,232,704 | 11/1980 | Becker et al. . | |
| 4,241,752 | 12/1980 | Ackroyd . | |
| 4,244,392 | 1/1981 | Griswold et al. . | |
| 4,244,395 | 1/1981 | Griswold et al. . | |
| 4,249,556 | 2/1981 | Waletzko . | |
| 4,276,897 | 7/1981 | Griswold . | |

Primary Examiner—Gerald A. Michalsky
Attorney, Agent, or Firm—Cushman, Darby & Cushman

[57] ABSTRACT

A check valve assembly for use in backflow preventer apparatus or the like, the check valve assembly being of the poppet valve type. The assembly includes a body member having a flow passage therethrough with an inlet and an outlet, the body member further having an annular valve seat in said passage and an opening in its wall opposite and coaxial with the valve seat. A tamper-proof preloaded valve module is inserted through said opening for coacting with the valve seat and the module is retained in position within the body by a cover plate closing the opening.

6 Claims, 5 Drawing Figures

CHECK VALVE ASSEMBLY FOR USE IN BACKFLOW PREVENTERS OR THE LIKE

FIELD OF THE INVENTION

The present invention relates to an improved check valve assembly for use in backflow preventer apparatus or the like and more particularly to a check valve assembly which includes a tamperproof preloaded valve module for coacting with the valve seat, the module further loading the spring element when installed and retained in place by a cover plate covering the opening through which the module is inserted. When the module is removed from the body member, it cannot be disassembled by conventional tools in the field, thus protecting service personnel.

BACKGROUND OF THE INVENTION

Backflow preventer apparatus are well known in the art and are used in water distribution systems to prevent contamination of the potable water portion by preventing backflow of liquid from the nonpotable portion beyond a certain point in the system. These backflow preventers are usually provided with one check valve or two check valves in series in a flow passage, the one or two check valves permitting flow of water from a supply pipe to a service pipe but preventing the backflow of liquid from the service pipe to the supply pipe during certain conditions such as "back siphonage" in the supply pipe or "back pressure" in the service pipe. The check valves usually include an annular valve seat provided in the body member of the same and a spring urged to closed position movable valve element for coacting with the seat.

In the more recent backflow preventer apparatus, the use of a preloaded valve module for the movable valve element has been used primarily where the movable valve element is a poppet-type valve element, i.e., a valve disc having a valve stem, a spring retainer and a coil spring held restrained at one end by a spring retainer and at the other end by the disc.

The springs used in such preloaded valve modules are quite highly loaded, for example, in an 8 inch valve, the loading of the spring would be approximately 370 pounds or more. The preloaded valve modules are installed in the body member at the manufacturing facility and thus, the entire check valve unit which forms a portion of the backflow preventer is installed at the site of use without removal of the valve module. However, oftentimes in the field a service person will try to service the valve module should the check valve leak. Because of the extreme load on the spring, this could be a very dangerous situation if the valve module can be indiscriminately disassembled. Another danger, which could occur, would be a situation where the valve stem failed and the cover plate of the body member was removed. The spring would have nothing to restrain it and once the bolts for the cover plate are free of the valve body member, there could be injury to the service personnel by the spring expanding and causing the cover plate to eject with considerable force.

SUMMARY OF THE INVENTION

According to the present invention, there is provided a check valve for use in backflow preventer apparatus or the like, the check valve including a valve body member having a flow passage therethrough with an inlet and an outlet, the valve body member further having an annular seat in the passage and an opening through its wall opposite and coaxial with the valve seat. A tamperproof preloaded valve module is inserted through the opening for coacting with the valve seat, the tamperproof preloaded valve module being retained in position within the body by a cover plate covering the opening. The preloaded valve module includes a disc having a valve stem extending from one side thereof with the other side having a seal element for coacting with the valve seat. A spring surrounds the valve stem and engages the one side of the valve disc, the spring being retained by a spring retainer which is a tapered cup-shaped body having an annulus at one end for receiving the valve stem and a radial outwardly extending flange at the other end for engaging the shoulder in the opening. A retaining nut threaded onto the valve stem when the spring is compressed insures the preloading of the spring, and means are provided to prevent unthreading of the retaining nut in the field when the module is removed from the valve body without first compressing the spring by relative movement of the valve disc toward the spring retainer.

Another object of the present invention is to provide a preloaded valve module separate from the cover plate, the preloaded module having a full overall length prior to installation greater than the overall length between the valve seat and the opening in the valve body whereby the spring of the valve module is further loaded when the cover plate is installed and moves the spring retainer toward the valve disc.

Ancillary to the aforementioned object, it is a further object of the present invention to so control the overall length of the module such that when the bolts which retain the cover plate on the valve body are loosened, it will first require considerable torque, and when the module has extended to its full overall length, further removal of the bolts will be at a lesser torque. By such an arrangement, should the valve stem of the movable valve element fail, the serviceman will be aware of a dangerous situation as there will be no reduction in torque and, thus, further removal of the cover plate can be made with care.

A further object of the present invention is to provide the movable valve element of the preloaded valve module with guide means which cooperate with the wall of the annular valve seat so that the valve disc is in the same position on said seat after each operation of the valve, and the valve stem will travel in a straight line and not bind in the annulus on the spring retainer.

These and other objects of the present invention will appear more fully in the following specification and drawings.

DETAILED DESCRIPTION OF THE INVENTION

Figure 1:
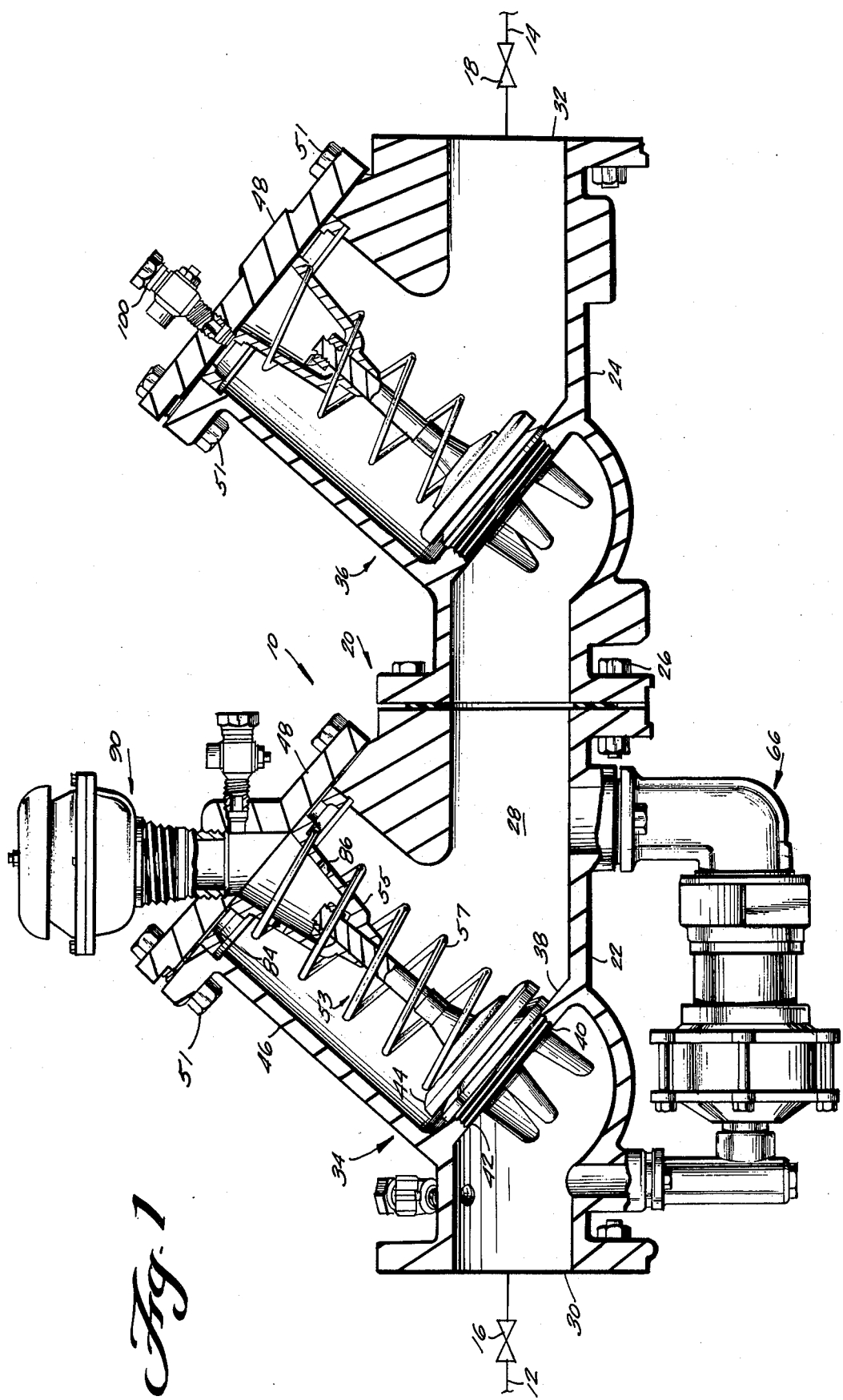
FIG. 1 is a partly schematic vertical sectional view through a backflow preventer apparatus utilizing the improved check valve assemblies of the present invention.

Referring to FIG. 1 wherein like characters or reference numerals represent like or similar parts, there is disclosed a backflow preventer apparatus generally designated at 10 and utilizing a pair of poppet-type check valves 34 and 36 of the present invention. While the present invention is described in connection with a backflow preventer apparatus 10, it is, of course, within the scope of this invention that the check valve hereinafter described and claimed could be utilized wherever highly loaded spring actuated poppet-type check valves are used.

The backflow preventer apparatus 10 includes a body member 20 having a flow passage 28 therethrough with an inlet 30 and an outlet 32. The body member 20, as shown, includes an upstream body portion 22 and a downstream body portion 24 bolted together as indicated at 26. Of course, if desired, the body member 20 could be made as a single casting for housing both check valves 34 and 36. A differential pressure-operable relief valve assembly senses the pressure upstream of and downstream of the upstream check valve 34 and when a condition occurs which could result in backflow, such as "back siphonage" or "back pressure" and one of the check valves is fouled, then the differential pressure operable relief valve assembly 66 operates to discharge liquid in the zone between the two check valves 36 and 34. A detailed disclosure of the relief valve assembly 66 will be found in U.S. patent application Ser. No. 383,306, filed concurrently herewith by Joseph L. Daghe and Robert E. Sands, and entitled "RELIEF VALVE ASSEMBLY FOR USE WITH BACKFLOW PREVENTERS."

The backflow preventer assembly of FIG. 1 is shown provided with a vacuum breaker 90 communicating with the zone between the check valves 34 and 36. The operation and detailed description of the vacuum breaker 90 is provided in U.S. patent application Ser. No. 383,305, filed concurrently herewith by Joseph L. Daghe, Robert E. Sands and Dennis W. Humes, and entitled "BACKFLOW PREVENTER APPARATUS."

The backflow preventer as shown is usually positioned between gate valves 16 and 18, the gate valve 16 being connected to the supply pipe 12, which may be a water main, whereas the gate valve 18 is connected to the service pipe 14 to a facility such as a manufacturing plant or the like.

The check valve 34 of the present invention will now be described. The valve body member 20, which has the passage 28 therethrough, is provided with a slanted web 38 having a threaded aperture 40 which carries a valve seat ring 42. The valve seat ring 42 has a tapered seating surface and an annular wall 54 therethrough. The diameter of the wall 54 is substantially equal to the diameter of the passage 28. The check valve 34 further includes a movable valve element 44 of the poppet type.

The body member 20 is provided with a boss or barrel-like structure 46 having an opening 47 (FIGS. 2 and 3) at its outer end, the opening 47 being coaxial with the valve seat ring 42. The opening 47 is provided with an outwardly facing shoulder 49. The opening 47 is closed by a cover plate 48, the cover plate being bolted to the body member as indicated at 51.

A spring loaded valve module generally designated at 53 includes the movable valve element 44, a spring retainer 55 and a coil spring 57 restrained at one end by the spring retainer 55 and at the other end by the movable valve element 44. In more detail, the movable valve element includes a valve disc 70 having a valve stem 72 extending from one side thereof and a seal element 74 carried on the other side thereof by means of a guide member 56 bolted thereto as indicated at 59. The guide member 56 has a plurality of upstream extending fingers 60 which cooperate with the wall 54 through the seat ring 42. A detailed description of the configuration of the guide member 56 and its fingers 60 as well as the interior of the flow passage whereby improved flow characteristic are obtained, is found in the aforementioned Daghe et al. U.S. patent application Ser. No. 383,305.

The spring retainer 55 has a tapered cup-shaped body 78 provided with an annulus 80 at one end thereof which receives the end portion of the shaft 72. The tapered body 78 further is provided with a radial outwardly extending flange 82 having a diameter equal to the diameter of the opening 47 outwardly of the shoulder 49.

Figure 2:
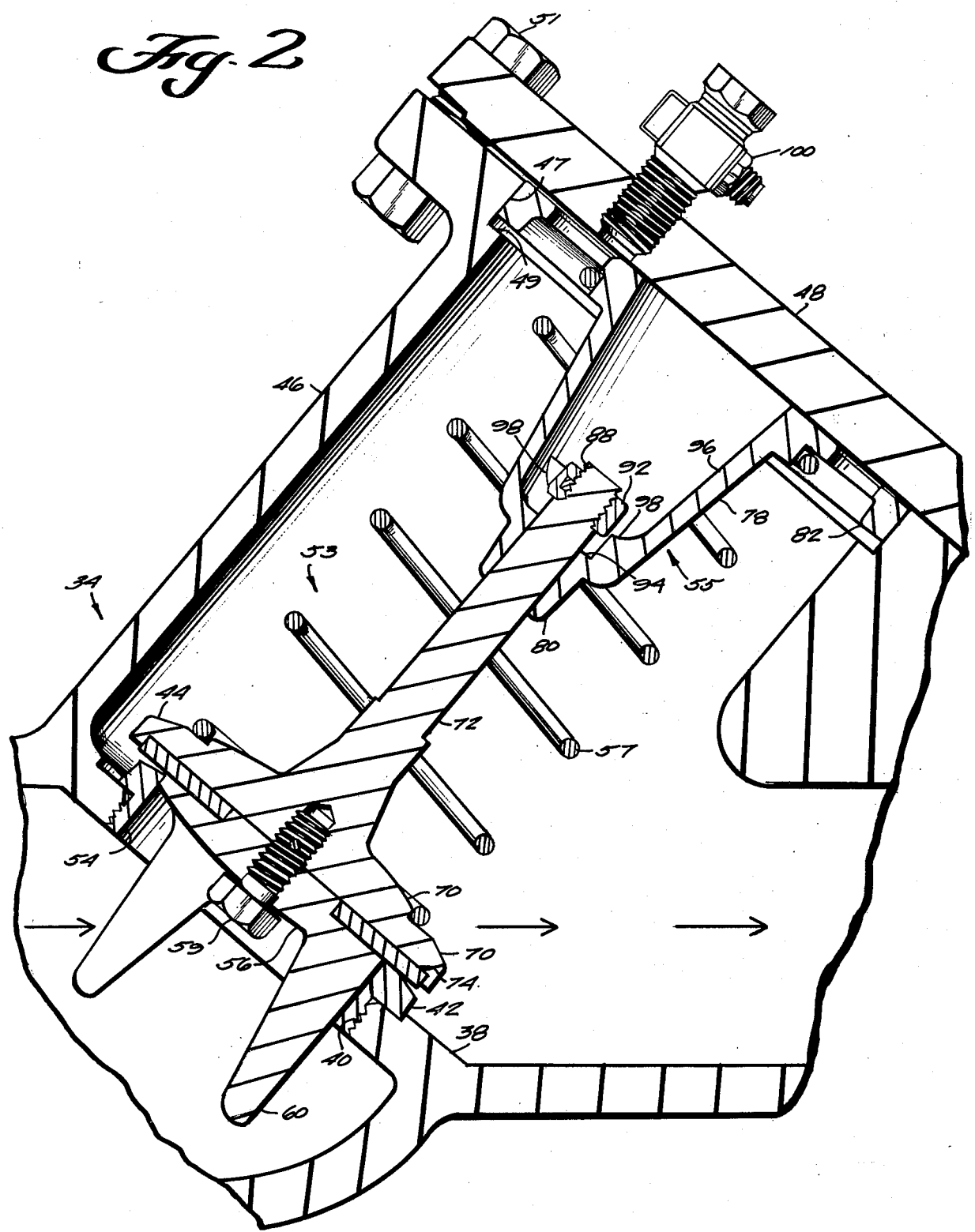
FIG. 2 is an enlarged fragmentary vertical sectional view of the check valve assembly of the present invention.
Figure 3:
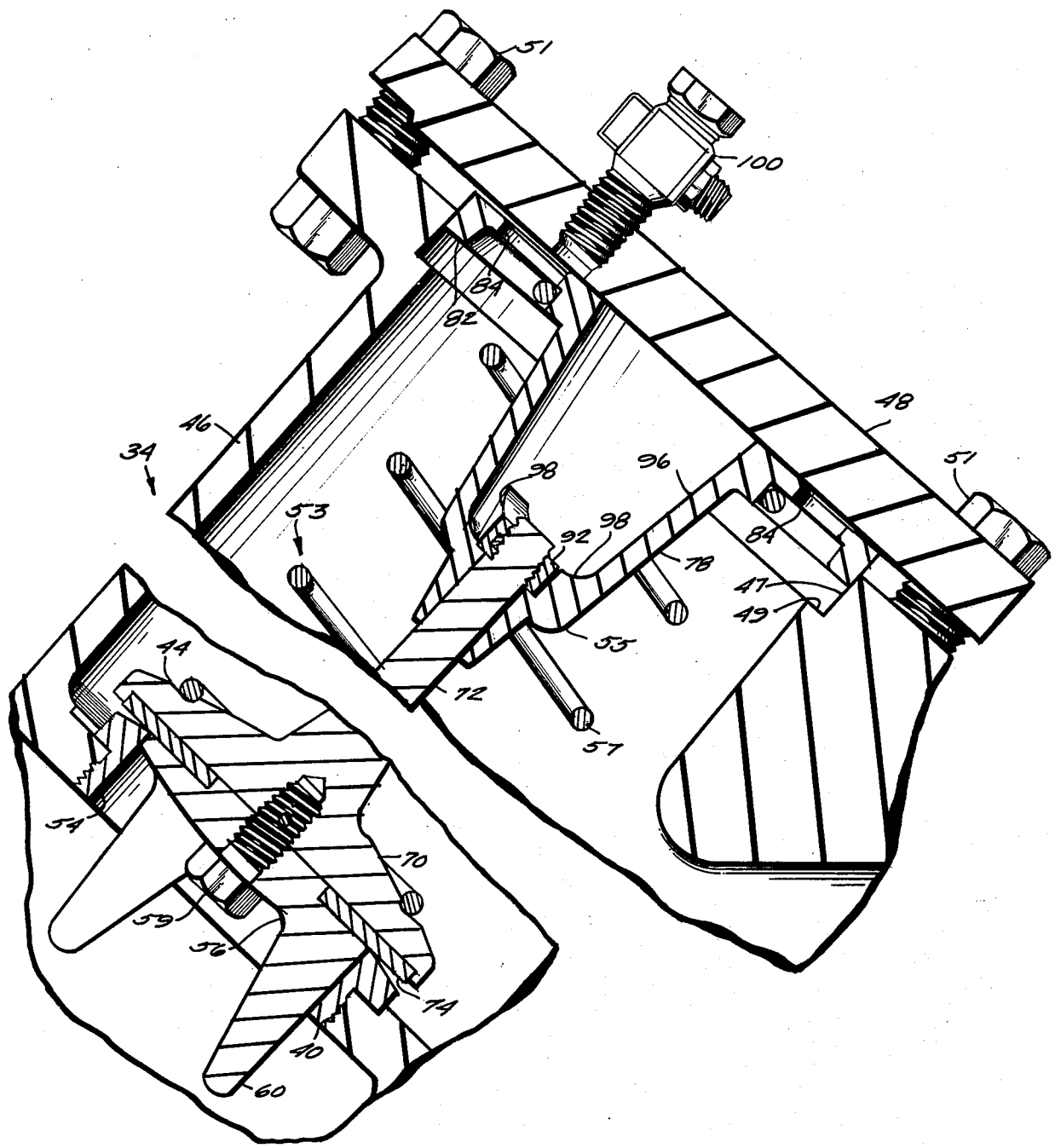
FIG. 3 is a view similar to FIG. 2 but illustrating the removal of the valve module at the point where the valve module has extended to its full or maximum overall length.
Figure 4:
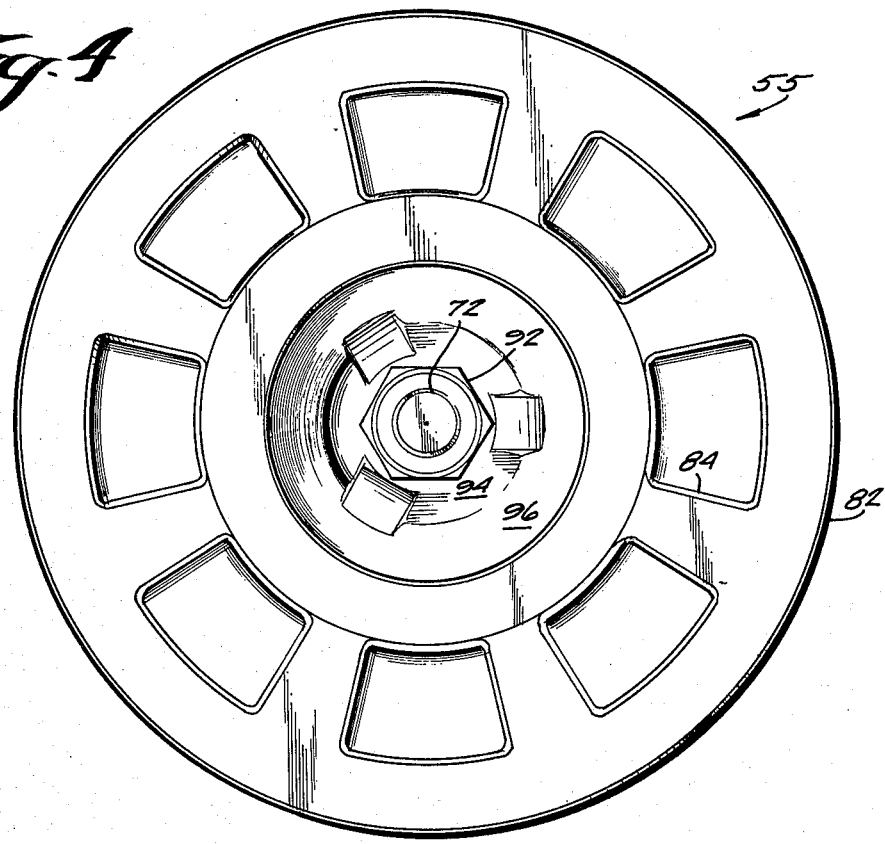
FIG. 4 is a top plan view of the valve module and illustrating the means for preventing removal of the retaining nut.
Figure 5:
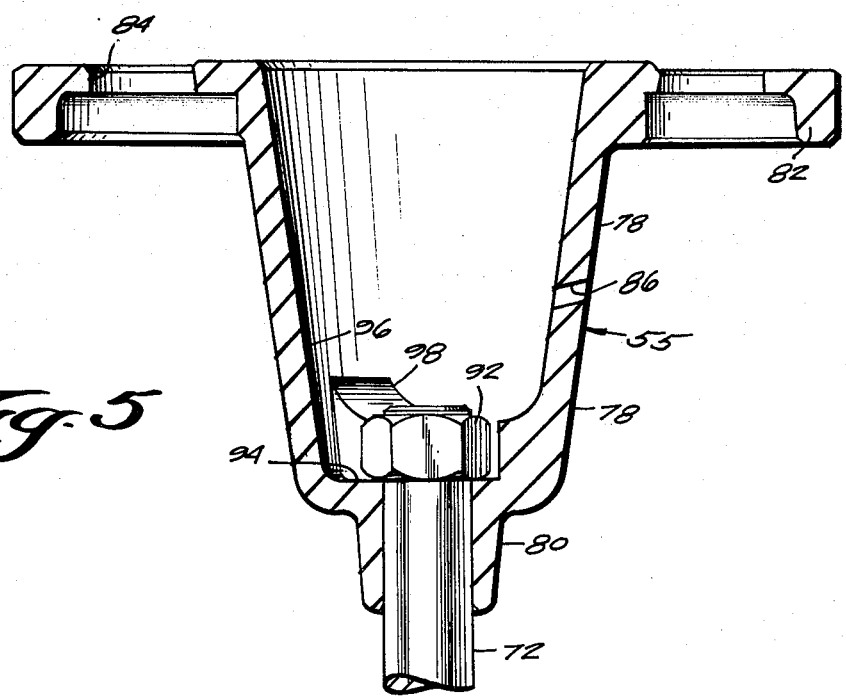
FIG. 5 is a fragmentary vertical sectional view of FIG. 4.

As best shown in FIGS. 4 and 5, the flange 82 is provided with apertures 84, whereas the cup-shaped body member 78 may be provided with one or more apertures 86 in its wall. The purpose of providing the at least one aperture 86 in the cup-shaped body member 78 is so that there can be communication with the zone between the check valves 34 and 36 and the vacuum breaker 90 when a vacuum breaker is used. As shown in FIGS. 2 and 3, the cover plate 48 is merely a flat cover plate and is not used when a vacuum breaker 90 is installed. If a vacuum breaker is used, then the cover plate 48 will be of the configuration shown in FIG. 1. The apertures 84 are used when a test cock 100 is mounted in the cover plate 48 as shown in FIGS. 2 and 3.

The upper end of the valve stem 72 is threaded as indicated at 88. The threaded end 88 is arranged to receive a nut 92 when the module 53 is assembled. To assemble the module 53, the spring 57 is positioned over the valve stem 72 and engages the valve disc 70 of the movable valve element 44. The spring retainer 55 is then placed over the end of the valve stem 72, and the spring retainer 55 is moved toward the valve disc 70 so as to load the spring 57. When the valve stem 72 has extended far enough into the interior of the tapered body 78 whereby the threads 88 are exposed above bosses 98, the nut 92 is applied. When pressure is released, the valve stem and the disc 70 will move away from the spring retainer 55 until the head of the nut 92 bears against the interior wall 94 of the annulus 80.

In order to prevent inadvertent removal of the nut 92 when the module 53 is removed from the body member 20, the interior wall 96 of the cup-shaped body 78 is provided with the plurality of bosses 98 which have their radially inner ends positioned closely adjacent the nut 92. By such an arrangement, the bosses 98 prevent conventional tools from being applied to the nut 92 to unthread the same. The only way the nut 92 can be removed in the field is by compressing the spring retainer toward the valve disc 70 so that the valve stem 72 would move relative to the spring until it reached a position where the nut 92 is above the bosses 98 and, of course, this would require a special tool due to the high load on the spring 57.

Referring to FIG. 2, the module 53 is shown installed in the check valve 34, and it will be noted that the nut 92 has moved out of influence of the bosses 98. As previously mentioned, there is a predetermined spring loading placed on the spring 57 when the module 53 is assembled and, thus, the overall length between the seal element 74 and the flange is designed to be greater than the overall length between the valve seat 42 and the opening 47. Consequently, when the cover plate 48 is applied and the bolts 51 are tightened, the spring is further loaded as the flange of the spring retainer enters the opening 47.

The arrangement just described with respect to the overall length of the module 53 between the seal element 74 and the flange 82 relative to the overall length between the valve seat 42 and the opening 47 provides an added safety feature when it is desired to remove the module 53 for repair or replacement. When the bolts 51 are loosened as shown in FIG. 3, the initial torque on the bolts 51 will be quite high because of the spring load urging the spring retainer 55 against the cover plate 48. When the module 55 has expanded to its complete overall length, then the torque on the bolts 51 lessens. If, for any reason, the valve stem has failed, the torque will remain high on the bolts 51 and, thus, the serviceman is warned and care can be taken in further removing the cover plate and the module.

The terminology used throughout the specification is for the purpose of description and not limitation, the scope of the invention being defined in the claims.

What is claimed is:

1. A check valve to prevent backflow in a system comprising:
    a body member having a flow passage therethrough with an inlet and an outlet, said body member further having an annular valve seat in said passage and an opening through its wall opposite and coaxial with said valve seat;
    a tamperproof pre-loaded valve module inserted as a unit through said opening for coacting with said valve seat and removable as a unit;
    a cover plate for retaining said valve module in position in said body member;
    said module including a valve disc having a valve stem extending from one side thereof with the other side having a seal element for coacting with said valve seat, a spring retainer, said spring retainer having a tapered cup-shaped body with an annulus at one end for receiving said valve stem therethrough and a radial outwardly extending flange at the other end having a diameter to fit within said opening, a coil spring extending between said flange of said spring retainer and said valve disc, and a retaining nut carried on the end of said valve stem within said tapered body to provide a preload on said spring, said retaining nut being threaded onto said valve stem and seated against said annulus of said spring retainer when said coil spring is compressed and prior to insertion of said module into said body member, said module having an overall length between said seal element and said flange of said spring retainer greater than the overall length between said valve seat and said opening whereby when said module is inserted into said body member onto said valve seat, said cover plate is installed, said spring retainer slides on said valve stem and applies a further load on said spring; and
    means to prevent inadvertent unthreading of said nut when said module is removed from said valve body until said spring is compressed, said means for preventing inadvertent unthreading of said nut including bosses provided on the interior of the tapered cup-shaped body adjacent the end having the annulus, said bosses being positioned closely adjacent to the periphery of said nut whereby a conventional tool cannot be placed on said nut unless said spring is compressed to cause said valve stem to move relative said spring retainer to lift said nut away from said annulus and said bosses.

2. A check valve as claimed in claim 1 including bolt means for retaining said cover plate in engagement with said body member, said bolt means having a length sufficient when unthreading said bolt means for removing said module to initially require a high torque when relieving said further load on said spring and having a lesser torque when said spring of said module has reached said preload and, when said valve stem has failed, unthreading of said bolt means will require the higher torque throughout the entire unthreading thereby providing a warning should be taken in further removing of said cover plate and said module.

3. A check valve as claimed in claims 1 or 2 in which said valve seat in said passage is a removable seat ring having an annular wall and wherein said module includes guide means attached to said valve disc and cooperating with the wall of said seat ring.

4. A check valve as claimed in claim 3 in which said valve seat is inclined to the longitudinal axis of said passage and wherein said body member is provided with an inclined barrel-like structure defining said opening and having a longitudinal axis coaxial with the axis of said valve seat.

5. A check valve as claimed in claim 4 wherein said tapered cup-shaped body of said spring retainer is provided with at least one aperture therethrough and wherein said flange is provided with at least one aperture therethrough.

6. A check valve as claimed in claims 1 or 2 in which said valve seat is defined by a seat ring removably carried by said body member and has an annular wall and in which guide means are attached to said valve disc for cooperating with the wall of said seat ring when said disc is moved off of said valve seat, said guide means including a plate bolted to said valve disc and having fingers engaging the wall of said seat ring and extending in an upstream direction.

* * * * *